United States Patent [19]

Berwin

[11] 3,984,664

[45] Oct. 5, 1976

[54] DIGITAL SYSTEM FOR GENERATING A CIRCLE ON A RASTER TYPE TELEVISION DISPLAY

[75] Inventor: Ted W. Berwin, Playa Del Rey, Calif.

[73] Assignee: Hughes Aircraft Company, Culver City, Calif.

[22] Filed: Jan. 20, 1975

[21] Appl. No.: 542,626

[52] U.S. Cl. .......................... 235/151; 340/324 AD

[51] Int. Cl.² .......................................... G06F 3/14

[58] Field of Search ............... 235/151; 340/324 AD

[56] References Cited

UNITED STATES PATENTS 3,789,200 1/1974 Childress et al. .................. 235/151

*Primary Examiner*—Eugene G. Botz

*Attorney, Agent, or Firm*—Rafael A. Cardenas; William H. MacAllister

[57] ABSTRACT

A system is disclosed for generating a circle on a television raster display utilizing digital techniques. An $x$ coordinate counter, a $y$ coordinate counter, a radius number, and a radius $+\delta$ number, in parallel to each other, are connected to the input terminals of a multiplex switch. The multiplex switch selectively provides an output signal of the above number generators to a programmable read only memory (PROM). The memory in turn sequentially provides an output signal representing the square of the input number, i.e., $x^2$, $y^2$, $r^2$ and $(r+\delta)^2$. The numbers $x^2$ and $y^2$ are added by an adder and the number $x^2+y^2$ is compared by a first comparator, with the number $r^2$ and an output is provided if $x^2+y^2 \geqslant r^2$. The numbers $x^2+y^2$ is also compared by a second comparator, with the number $(r+\delta)^2$ and an output signal is provided if $x^2+y^2 < (r+\delta)^2$. An output signal is provided to a television display whenever the above equations are true. Thus, each point on a television raster display is tested and a video signal is provided when the equations are both true.

7 Claims, 3 Drawing Figures

DIGITAL SYSTEM FOR GENERATING A CIRCLE ON A RASTER TYPE TELEVISION DISPLAY

FIELD OF THE INVENTION

This invention relates generally to a system for generating conic symbols. In particular, this invention relates to a system for generating circle symbols on a television raster display by utilizing digital techniques.

DESCRIPTION OF THE PRIOR ART

Systems for generating circles and elipeses on a cathode ray tube are generally known in the prior art. One such system is described in METHODS AND APPARATUS FOR GENERATING ELECTRICAL WAVE FORMS AND QUADRATURE PHASE TRAPEZOIDAL AND/OR SINUSSOIDAL WAVE FORMS by James P. Godfrey in U.S. Pat. No. 3,697,877. Although the Godfrey patent utilizes some digital technology, the circular waveform is generated by the "stroke" method, i.e., an electron beam traces the desired waveform on a cathode ray tube display screen much like a pencil writes. The stroke method cannot be used to generate a circle symbol on a television raster display since the input format and circuitry of a stroke system do not lend themselves to a raster type display. In a raster type display the electron beam scans a plurality of horizontal lines to develope an image, while in the stroke method the beam itself traces the circle. Several drawbacks are associated with the stroke methods of developing a conic symbol on a cathode ray tube. One drawback is that the $x$ and $y$ coordinate voltages and currents must be high in order to properly drive a cathode ray tube and as a consequence, high power is required. Another drawback is that if the electron beam stops tracking at any point, the high-power beam will burn a hole in the display screen.

SUMMARY OF THE INVENTION

Accordingly, it is an object of the present invention to provide a simple, reliable and accurate system for generating conic symbols on TV type displays.

It is another object of the present invention to provide a digital system for generating circles on television raster display.

It is still another object of the present invention to provide a programmable digital symbol generating symbol for displaying circles of varying radii and line thicknesses.

In accordance with the foregoing objects, a symbol generating system includes first, second and third source of signals representing $x^2 + y^2$, $r^2$ and $(r + \delta)^2$, respectively. First comparator means compares $x^2 + y^2$ with $r^2$ and provides a first signal if $x^2 + y^2 \geq r^2$. Second comparator means compares $x^2 + y^2$ with $(r + \delta)^2$ and provides a second signal if $x^2 + y^2 < (r + \delta)^2$. If the first and second signals coincide a video signal is provided to a television raster display.

DETAILED DESCRIPTION OF THE DRAWINGS

Figure 1:
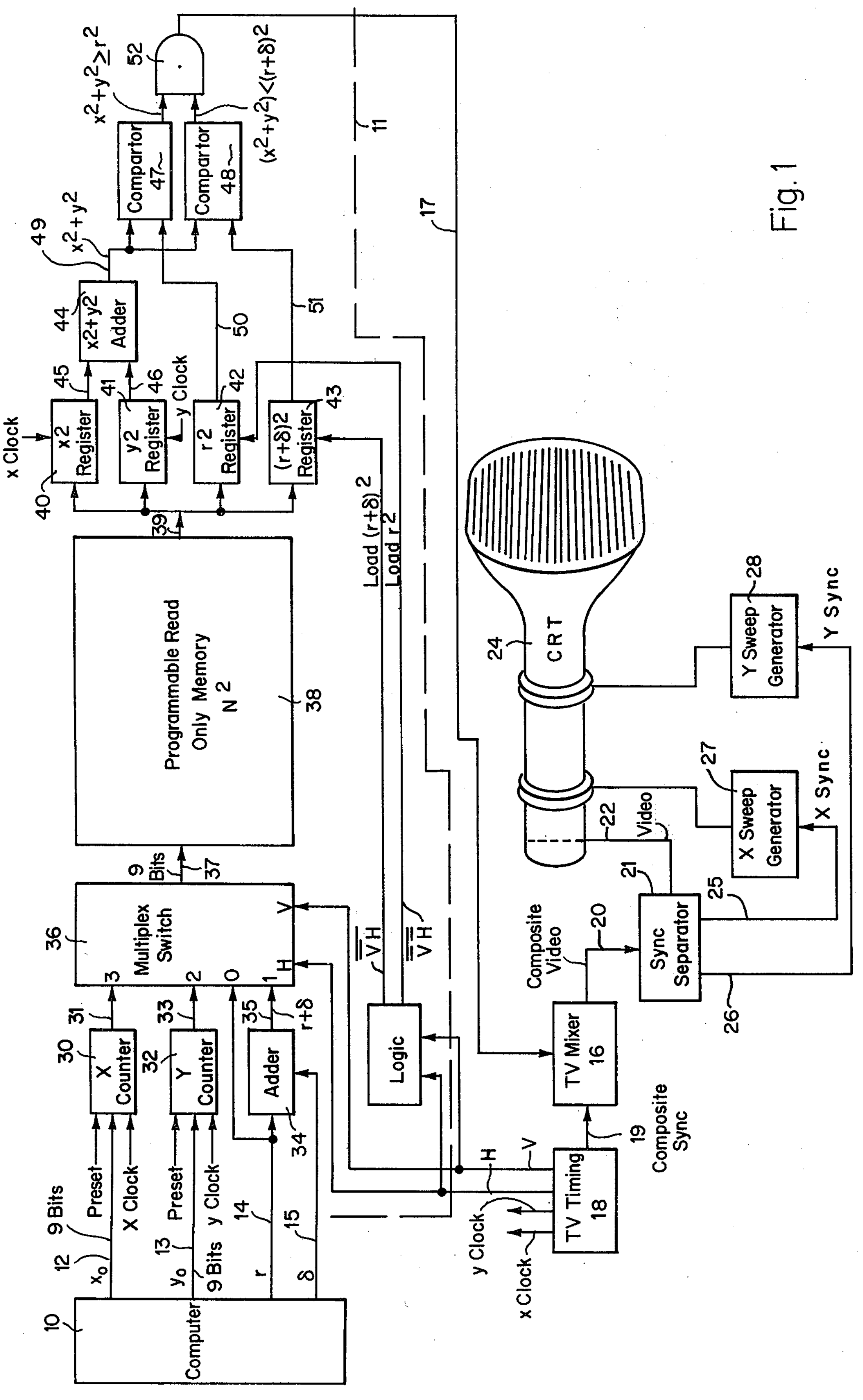
FIG. 1 is a schematic block diagram of a digital circle generator.

Referring more specifically to FIG. 1, a symbol generating system for generating a circle on a television raster display is herein described. A computer 10 is connected to a symbol generator 11 by four composite leads 12, 13, 14 and 15. Composite lead 12 supplies the $x$ preset number for locating the origin of the $x$ axis of the origin of the circle on the display screen. Composite lead 13 supplies the $y$ preset number for locating the origin of the $y$ axis of the circle on the display screen. Composite lead 14 supplied the radius data, $r$, of the circle to be generated. The composite lead 15 provides the line thickness, $\delta$ of the circle. The composite leads 12 and 13 each include nine wires for conveying the nine bit digital information. The composite lead 14 is composed of eight wires for providing eight bit digital data to the circle generator 11. The composite lead 15 may include 1 to 8 wires for providing the thickness date $\delta$.

The circle generator 11 generates the video data in response to the computer 10 and provides the data to the TV mixer 16 on lead 17. A more detailed description of the circle generator 11 is developed below.

The TV timing network 18 is connected to the circle generator 11 and provides the necessary timing signals: $x$ clock, $y$ clock, horizontal sweep (H), and vertical sweep (V), to the generator 11. The TV timing network 18 is also connected to the TV mixer 16 and provides composite sync signals to the mixer 16 on a single lead 19.

The mixer 16 combines the video signal from the circle generator 11 with the synchronizing signals from the TV timing network 18 and provides a single lead output signal on lead 20 to the sync separator network 21.

One output terminal of the separator 21 is connected to the grid electrode 23 of a television tube 24 via lead 22. Leads 25 and 26 connect the sync separator 21 with the $x$ sweep generator 27 and the $y$ sweep generator 28, respectively. The sync separator 21 separates the video signal from the circle generator 11, and the sync signals from the mixer 16. The video signals are provided to the grid electrode on the lead 22 while the $x$ sync signal is applied to the $x$ sweep generator 27 on lead 25. The $y$ sync signal is applied to the $y$ sweep generator 28 on lead 26. The $x$ and $y$ sweep generators 27 and 28, respectively, are connected to their respective yokes on the TV tube 24.

The circle generator 11 includes an $x$ coordinate counter 30 which counts the $x$ clock pulses received from the TV timing network 18. The $x$ clock pulses may be any frequency suitable for television raster display systems, such as 9 mHz, for example. The counter 30 also receives an $x_0$ signal from the computer for varying the position of the $x$ coordinate over the display raster. A preset command lead is provided to the counter 30 for setting the counter to zero or to a predetermined number $x_o$. The output terminals of the counter 30 are connected to the input terminals, representing switch position "3", of a multiplex switch 36 by a composite lead 31.

If the origin of the circle to be generated is at the center of the screen, the $x$ counter 30 begins counting at −256 and counts up by ones to +255, in response to 512 x clock pulses per line supplied by the timing network 18. The 512 clock pulses represent 512 points on one line of video data on a display screen. At the end of each line of video the counter is reset to −256 and counting commences again until each line of a complete frame or raster is displayed. If the origin of the circle is to be at some position to the right or left of the center of the screen, then the counter 30 is preset with the appropriate number. For example, the counter may be preset to −356 if the origin of the $x$ axis is to be moved 100 clock pulses or positions to the right of the screen.

A $y$ coordinate counter 32 is connected to the TV timing network 18 and counts the $y$ clock pulses generated thereby. The frequency of the $y$ clock pulse signal from the network 18 may be 15.75 kHz for example. The computer 10 provides a number, such as $y$, on lead 13 for setting the $y$ counter at some predetermined number and thereby determining the origin of the $y$ coordinate axis. The output terminals of the counter 32 are connected to the input terminals, representing switch position "2", of the multiplex switch 36 via a composite lead 33.

If the origin of the circle to be generated is at the center of the screen, the $y$ counter 32 begins counting at +255 and counts down by twos to −255 in response to 256 clock pulses, in response to the timing signals, $y$ clock, from the timing network 18. Each $y$ clock pulse occurs at the end of the horizontal line of video data which is displayed by the tube 24. The counter 32 counts down by twos if there are two fields per raster or frame. If there is only one field per raster then the counter 32 counts down by ones. At the end of the first field of a two-field raster, the $y$ counter 32 is reset to +254 and the countdown by twos commences again.

If the origin of the circle is to some position above or below the center of the display, the counter 32 is preset with the appropriate number. For example, the counter may be preset to +355 if the origin of they axis is to be positioned 100 video lines below the center of the display, assuming a 512 line TV.

The computer 10 is connected directly to the "0" switch position of the multiplex switch 36 and to a first set of input terminals of the adder 34 by the composite lead 14. The computer 10 supplies digital radius information $r$ corresponding to the desired circle size on the display.

The computer 10 is connected to the second set of input terminals of the adder 34 by the composite lead 15. The adder output terminals are connected to the multiple switch 36 via composite lead 35. The computer 10 supplies programmable line thickness data ($\delta$) of the circle on lead 15. The adder 34 adds the radius data ($r$) with the line thickness data ($\delta$) and provides the number $r + \delta$ to the switch position "1" of the multiplex switch 36.

The output terminals of the multiplex switch 36 are connected to the input terminals of a programmable read only memory (PROM) 38 by a nine bit composite lead 39. The multiplex switch 36 provides output signals representing of the numbers in the $x$ counter 30 during the horizontal trace i.e., −256 to +255. The number in the $y$ counter 32 is supplied by the switch 36 during the horizontal flyback time between subsequent lines in a field or frame. The radius number ($r$) is provided during a first interval of the vertical flyback time. The multiplexing timing control of the multiplex switch 36 is provided by the timing network 18. The multiplex switch 36 may be any suitable multiplexer such as the Fairchild TTL/MSI 9309, dual four input multiplexer.

The output terminals of the PROM 38 are connected to the input terminals of an $x^2$ register, a $y^2$ register an $r^2$ register, and an $(r+\delta)^2$ register by a composite lead 39. The PROM 38 provides an output number that is the square of the input number and may be any suitable high-speed electrically programmable memory such as the Intel 3601, 1024 bit read only memory.

The register 40 stores the $x^2$ number from the PROM 38 in response to the $x$ clock signal. The $x^2$ number is updated with every $x$ clock pulse, i.e., 512 updates per video line. The register 41 stores the $y^2$ number from the PROM 38 in response to the $y$ clock signal. The data in the $y^2$ register 41 is updated once at each clock pulse, i.e., during horizontal flyback. The $r^2$ register 42 stores the number $r^2$ in response to a load $r^2$ signal from the logic network 53 represented by $\overline{V H}$ the $r$ register 42 is updated during the vertical flyback time. The $(r+\delta)^2$ register 43 stores the $(r + \delta)^2$ number and is updated during vertical flyback also.

The output terminals of the $x^2$ register 40 and the $y^2$ register 41 are connected to the input terminals of an adder 44 by composite leads 45 and 46, respectively. The adder 44 sums the numbers in the registers 40 and 41 and provides an output number $(x^2 + y^2)$.

The output terminals of the adder 44 are connected to first and second comparators 47 and 48, respectively, by composite lead 49. The output terminals of the $r^2$ register are coupled to the second input terminals of the first comparator 47 by composite lead 50. The first comparator 47 compares the two input numbers and provides an output signal whenever $(x^2 + y^2)$ is greater than or equal to $r^2$. The comparators 47 and 48 may be any suitable network such as the Texas Instruments 4-bit magnitude comparators, SN 7485.

The $(r + \delta)^2$ register 43 output terminals are connected to the second input terminals of the second comparator 48, via composite lead 51. The comparator 48 compares the two input numbers and provides an output signal if $(x^2 + y^2)$ is less than $(r + \delta)^2$.

The two comparators 47 and 48 are connected to an AND gate 52 which provides an output pulse when the two comparators are true. The output of the AND gate 52 is applied to the TV mixer network 16 on lead 17.

The TV timing network 18 may be any suitable timing network for generating $x$ clock, $y$ clock, horizontal sweep (H), and vertical sweep (V) signals. The sweep signals H and V from the network 18 are connected to a logic network 53 which provides the appropriate control signals for multiplexing the switch 36 and for loading the $r^2$ and $(r+\delta)^2$ numbers into their respective registers.

The following logic table illustrates the states of the vertical and horizontal drives which provide the multiplex switch positions of the switch 36. The table also illustrates the load commands for $r^2$ and $(r + \delta)^2$.

Logic Table

| SWITCH POSITIONS | V | H | LOAD r | LOAD (r + ) |
|---|---|---|---|---|
| 0 | 0 | 0 | 1 | 0 |
| 1 | 0 | 1 | 0 | 1 |
| 2 | 1 | 0 | 0 | 0 |
| 3 | 1 | 1 | 0 | 0 |

The counters 30 and 32 may be absolute value counters. An absolute $x$ counter, $|x|$, may count from 255 to 0 and back to 256 for each line of video. An absolute $y$ counter, $|y|$, may count from 255 to 0 and back to 256 for each field. If absolute value counters are utilized, the memory size of the PROM 38 may be reduced to one-half, since negative numbers are not required.

Data from the computer 10 may be supplied to the multiplex switch 36 via two wires instead of 32. The two wire input may be implementated by utilizing storage registers for the four input signals, $x_o$, $y_o$, $r$, and $\delta$, and sequentially gating the input signals at predetermined times into those registers which inturn supply the signals to the multiplex switch 36.

Figure 2:
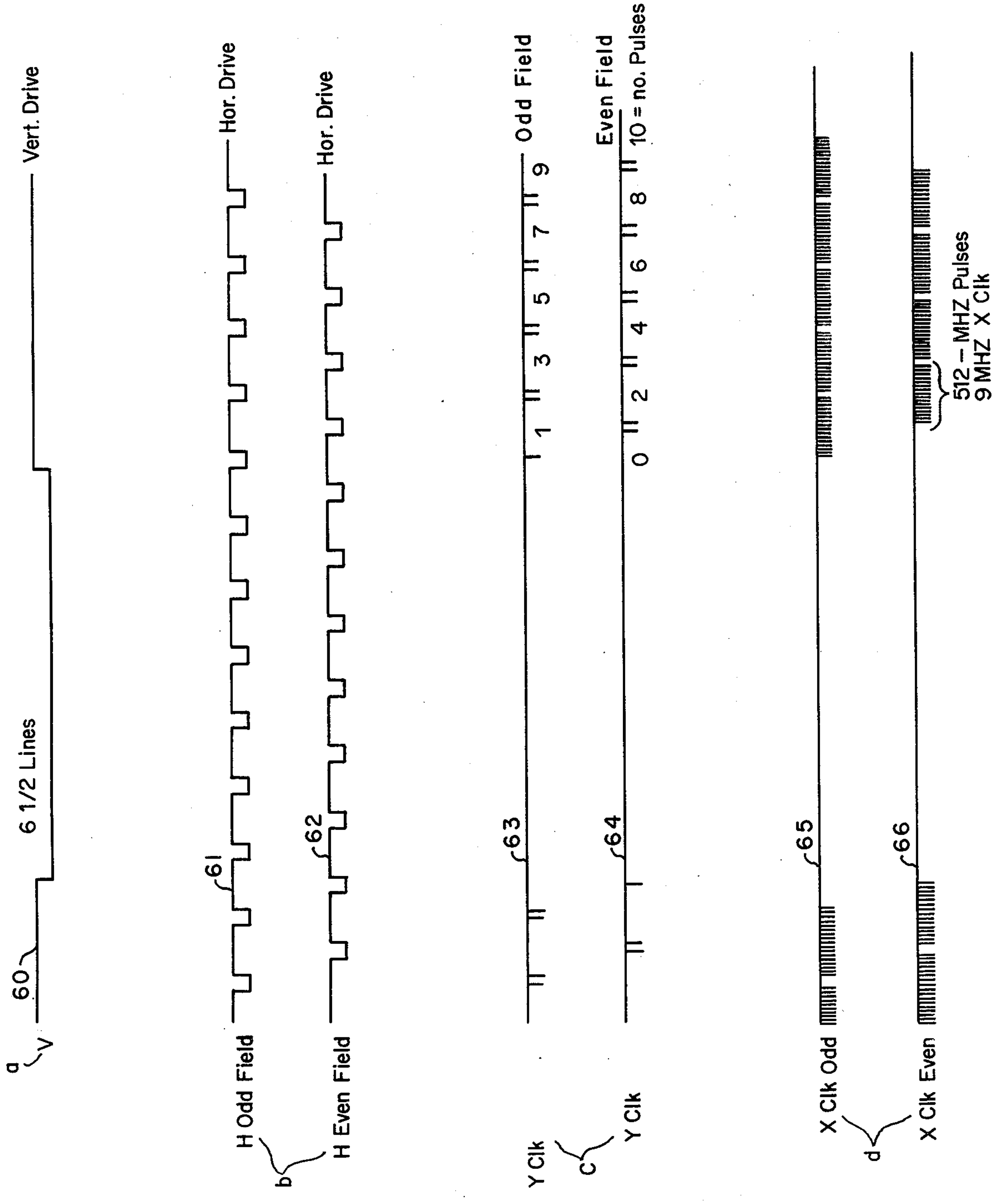
FIG. 2 is a representation of waveforms generated by the system of FIG. 1.

The timing and control signals developed by the TV timing network 18 are illustrated in FIG. 2. The waveform 60 in FIG. 2-*a* illustrates the vertical drive signal, V. The waveforms 61 and 62 in FIG. 2-*b* depict the horizontal drive signals H for both the odd and even fields. The waveforms 63 and 64 of FIG. 2-*c* represent the *y* clock signals for both the odd and even field respectively. In FIG. 2-*d* the waveforms 65 and 66 illustrate the *x* clock signals for odd and even fields, respectively.

A more detailed discussion of timing signals usually utilized in standard television display may be found in the EIA Standard RS-170, "Electrical Performance Standards-Monochrome Television Studio Facilities", published by the Engineering Department of the Electronic Industries Association, November, 1957.

The operation of the invention according to FIG. 1 is now described with reference to that figure and to FIG. 2.

The computer 10 provide a preset number $y_o$ to the *y* counter 32. For the purposes of discussion herein, it will be assumed that the origin of the coordinate axis is at the center of the screen. Therefore, the computer provides the counter 32 with a preset number corresponding to $y_o = +256$. The timing network 18 supplies a *y* clock signal to the counter 32 which commences a countdown from +256 in response to each clock pulse such as the waveform 64 for the even field. The timing network 18 also provides H and V signals to the logic network 53 which in turn positions the multiplex switch 36 such that the number from the counter 32 is provided at the composite lead 37. The programmable read only memory 38 in response to the counter 32 provides an output of the square of the $y^2$ input number. The $y^2$ number is stored in the $y^2$ register in response to the $y^2$ clock signal from the network 18. The *y* register in turn applies the *y* number to the adder 44.

The computer 10 also provides a preset number $x_o$ to the *x* counter 30, which for purposes of discussion herein, is assumed to be −255. The timing network 18 provides an *x* clock signal to the counter 30 which commences a countup from −255 in response to each clock pulse of waveform 64. The timing network 18 provides H and V signals to the logic network 53 which positions the multiplex switch 36 such that the output number of the counter 30 is provided to the composite lead 37. The programmable read only memory 38 in response to the counter 30 provides an output of the square of the input number. The $x^2$ number is stored in the $x^2$ register in response to the $x^2$ clock pulse 64 and the output of the $x^2$ register 40 is applied to the adder 44.

The number in the adder 44, $x^2 + y^2$, is applied to one input terminal of the comparator 47, which compares the number in the $r^2$ register and provides an output pulse if $(x^2 + y^2)$ is greater than or equal to $r^2$.

The number in the adder 44 is also compared with the number in the $(r + \delta)^2$ register by the second comparator 48 which supplies an output signal if $(x^2 + y^2)$ is less than $(r + \delta)^2$. The AND gate 52 provides an output pulse if the output signals of the comparators 47 and 48 are both true. The AND gate output signal is applied to the mixer 16 on lead 17, which in turn is applied to the sync separator 21 for applying a video signal to the television tube 24 and sync signals to the *x* and *y* sweep generators 27 and 28, respectively. Thus, one line of video is presented.

Figure 3:
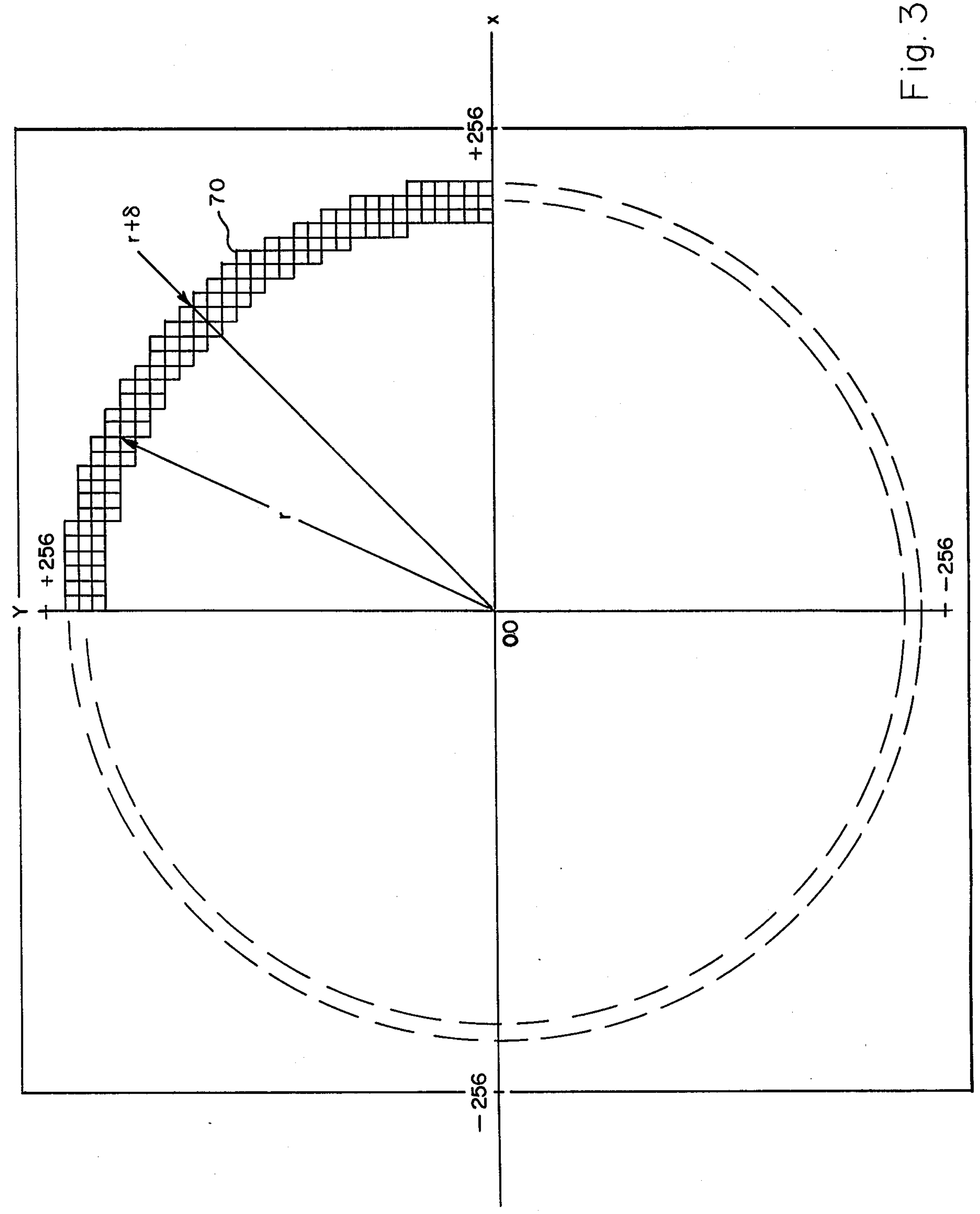
FIG. 3 is an illustration of a circle displayed on a television raster display screen.

Referring to FIG. 3, the circle generated on a television display screen according to FIG. 1 is now described. The circle 70 has a radius *r* and a line thickness $\delta$. The coordinate axis *x* and *y*, are located at the center of the display screen. As explained above the coordinate axis may be located at any other predetermined point by varying the preset number, $x_o$ and $y_o$ to the *x* counter 30 and the *y* counter 32, respectively. For the even field of a 2 field raster, the first *y* counter 32, commences a countdown at +256, the *x* counter 30 begins a countup from −256. For each line of the field the *x* counter 30 counts from −256 to +256. Wherever both of the above equations, $x^2 + y^2 \geq r^2$ and $x^2 + y^2 < (r+\delta)^2$ are true there is a video output. When the electron beam completes a scan of a first line of video it is directed back to the left hand side of the screen and the *x* counter 30 begins a countup from −256. The time between line scanning is commonly called "horizontal retrace" or "flyback". The *y* counter 32 counts down from +256 to +254.

All points on a line of a display are similarly tested to determine if the two above equations are true. Thus, there is a video signal for each point on each line where the equations are true.

When a first field has been displayed the electron beam is directed back to the top of the screen during the period that is known as "vertical retrace" or "vertical flyback". During vertical retrace the $r$ and $r + \delta$ numbers are provided to the multiplex switch 36. The second field, herein the odd field, is scanned beginning as the *x* counter 30 begins a countup from −256. The *y* counter 32 begins a countdown from +255. Thus an off field displayed.

It should be apparent from the foregoing that the present invention provides a unique and simple digital system for generating a circle on a television raster display.

Although the present invention has been shown and described with reference to particular embodiments, nevertheless, various changes and modifications obvious to one skilled in the art to which this invention pertains are deemed to lie within the purview of the invention.

What is claimed is:

1. A circle generating system for a display having *x* and *y* coordinates, said circle having a radius *r*, and a $\delta$ selected line thickness, a first source of signals representing $x^2 + y^2$;

a second source of signals representing $r^2$;

a third source of signals representing $(r + \delta)^2$;

first comparator means coupled to said first and second source for comparing the signals from said first and second sources and providing a first signal when $x^2 + y^2$ is at least equal to $r^2$;

second comparator means coupled to said first and third sources comparing said first and third sources and providing a second signal when $x^2 + y^2 < (r + \delta)^2$, coincidence means coupled to said first and second comparator means for providing an output upon coincidence of said first and second signals; and a raster display coincidence means coupled to said means for responding to said output to form a circle.

2. A circle generating system according to claim 1, comprising:

memory means for generating signals representing $x^2$, $y^2$, $r^2$, and $(r+\delta)^2$ in response to signals representing $x$, $y$, $r$ and $r+$, respectively, said $x^2 + y^2$ signals being applied to said first signal source in response to first and second timing signals said $r^2$ signals being applied to said second source in response to third timing signals said $(r + \delta)^2$ signals being applied to said third source in response to fourth timing signals.

3. A circle generating system according to claim 1, comprising:

a third source of signals representing $x$ coupled to said first source; said $x$ signals corresponding to positions along said $x$ axis, said third source generating a first set of signals for each $y$ signal; and a fourth source of signals representing $y$ coupled to said first source, said $y$ signals corresponding to positions along said $y$ axis.

4. A circle generating system according to claim 1, wherein said first source of signals, comprises:

first register means for providing signals representing $x$ coupled to said first and second comparator means; and second register means for providing signals representing $y$ coupled to said first and second comparator means.

5. A circle generating system according to claim 1, wherein said first source of signals, comprises:

a fourth source of signals representing $x$;

a fifth source of signals representing $y$; and adder means coupled to said fourth and fifth signal representing $x + y$, signals to said first and second comparator means.

6. A circle generating system according to claim 1, wherein said raster display means comprises:

a television display tube; having a video control electrode and providing an electron beam;

means coupling said coincidence means to said video control electrode of said television tube, means coupled to said television tube for providing $x$ and $y$ sweep of said electron beam.

7. A symbol generating system, comprising:

multiplex means providing input terminals for four input signals and providing four output signals at predetermined time intervals;

first signal means for sequentially generating first signals representative of numbers in a first number set coupled to said first input terminals of said multiplex means;

second signal means for sequentially generating second signals representative of numbers in a second number set coupled to said second input terminals of said multiplex means, each of said second number set being generated for each number of said first number set;

third signal means for generating third signals representative of a number in a third number set coupled to said third input terminals of said multiplex means;

fourth signal means for generating fourth signals representative of a number in a fourth number set coupled to said fourth input terminals of said multiplex means;

memory means coupled to said multiplex means for sequentially providing an output signal representative of the square of said input numbers.

means coupled to said memory means for sequentially adding and storing said squared numbers of said first and second signal means;

first comparator means for comparing the number in said adding and storing means with the square of a number in said third number set and providing a first output signal if said number in said adding and storing means is equal to or greater than said squared number of said third number set;

second comparator means for comparing the number in said adding and storing means with the square of a number in said fourth number set and providing a second output signal if said number in said adding and storing means is less than said squared number in said fourth number set;

means coupled to said first and second comparator means for providing a video signal in response to said first and second output signals.

* * * * *